N. DUMANSKY.
STOVE LID HANDLE.
APPLICATION FILED DEC. 8, 1915.

1,177,690.                                   Patented Apr. 4, 1916.

Inventor
N. Dumansky

By N. M. Wilson
Attorney

UNITED STATES PATENT OFFICE.

NICK DUMANSKY, OF ORMSTOWN, QUEBEC, CANADA.

STOVE-LID HANDLE.

1,177,690. Specification of Letters Patent. Patented Apr. 4, 1916.

Application filed December 8, 1915. Serial No. 65,807.

*To all whom it may concern:*

Be it known that I, NICK DUMANSKY, a subject of the Emperor of Austria-Hungary, residing at Ormstown, in the Province of Quebec and Dominion of Canada, have invented certain new and useful Improvements in Stove-Lid Handles, of which the following is a specification.

This invention relates to certain new and useful improvements in stove lid handles.

The primary object of the invention is to provide a handle for the lids of a stove so arranged that when the handle is attached thereto the lid cannot become accidentally detached, the device in this manner preventing the accidental dropping of the stove lid.

A further object of the invention is the provision of an attachment that may be readily applied to any of the usual forms of lid handles and providing a resilient lid retaining device therefor.

A still further object is to provide a device that is easy and inexpensive to manufacture and which may be readily applied to a lid lifter for readily grasping a lid when engaged by the handle and retaining the same during the lid moving operation.

With these general objects in view and others that will appear as the nature of the invention is better understood, the same consists in the novel combination and arrangement of parts hereinafter more fully described, illustrated in the accompanying drawings and pointed out in the appended claims.

Figure 1:
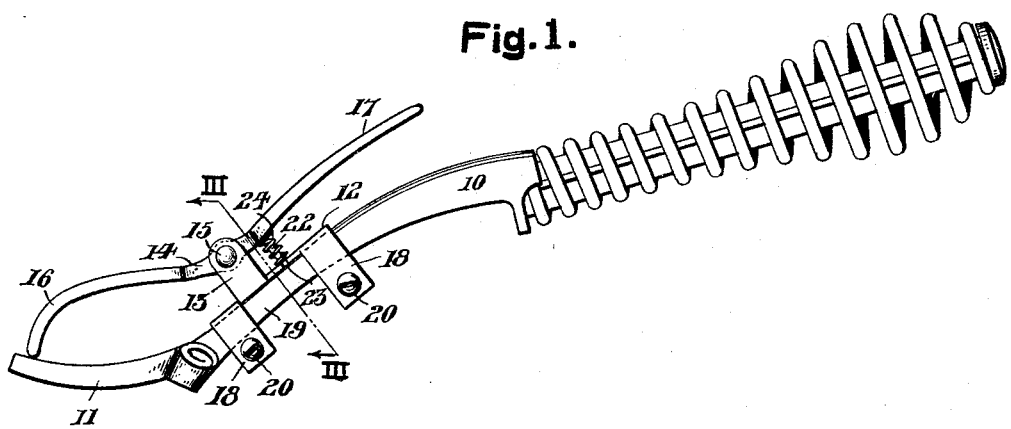
Figure 2:
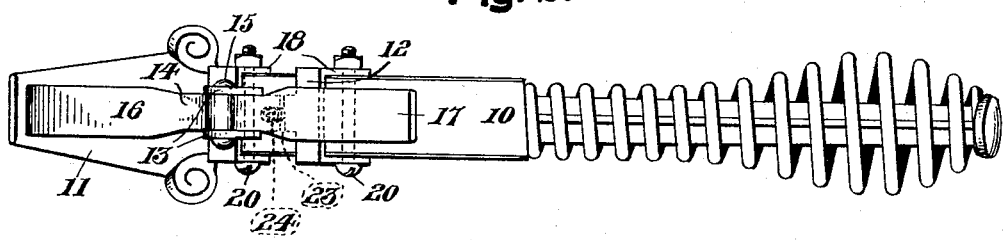
Figure 3:
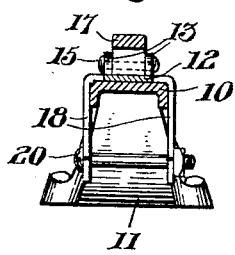
Figure 4:
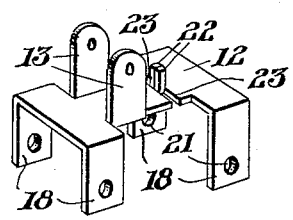

In the drawings forming a part of this application and in which like-designating characters refer to corresponding parts throughout the several views:—Figure 1 is a side elevation of a handle provided with the present device. Fig. 2 is a top plan view thereof. Fig. 3 is a transverse sectional view taken upon line III—III of Fig. 1, and Fig. 4 is a removable mounting frame for the device.

The invention being an attachment for an operating handle of a stove lid, the same is herein illustrated in connection with the lid handle 10 having a foot 11 of the usual form adapted for reception within the socket of the stove lid (not shown).

A removable clamp 12 is provided having upstanding ears 13 between which a clamping arm 14 is pivoted by means of a pin 15. The said clamping arm is provided with a curved engaging jaw 16 at one end thereof and an operating handle 17 at its opposite end.

Opposite pairs of lugs 18 are provided upon the clamp 12, the forward pair of which lie adjacent the jaw 16 and are spaced a less distance apart than the rear arm thereof. The clamp 12 is readily mounted over the handle 10 where the shank 19 thereof tapers toward its foot portion 11 and is adapted to be received between the said lugs 18, the clamp being removably retained upon the handle shaft by means of bolts 20 or similar members extending through alining perforations 21 in the pairs of lugs 18.

The clamp 12 is formed of a single piece of sheet metal with the ears 13 and the lugs 18 bent in opposite directions therefrom and is also provided with bent-up posts 22 positioned in contact with each other upon the same side of the clamp as the ears 13 and rearwardly thereof, or in other words positioned between the handle portion 17 of the arm and the clamp 12, side slots 23 being formed by the severing of the metal forming the said posts 22.

An expansion spring 24 is mounted over the posts 22 resiliently tensioned between the adjacent faces of the clamp 12 and the handle 17.

By this construction, it will be apparent that the spring 24 retains the curved jaw end 16 of the arm 14 in resilient contact with the upper face of the handle foot 11.

The complete operation of the device will be apparent, the lid handle 10 being grasped by the hand and the foot 11 inserted within the lid socket, while the jaw 16 is held away from the foot 11 by the handle 17. When the foot has been thus inserted, the handle 17 is released, thus allowing the jaw 16 to engage the adjacent portion of the lid and remaining in resilient contact therewith for retaining the handle operatively removably engaged with the lid. By depressing the handle 17, the jaws 16 may be readily disengaged from the lid and the handle 10 then easily removed from the lid socket.

While the form of the invention herein shown and described is what is believed to be the preferred embodiment thereof, it is nevertheless to be understood that minor changes may be made without departing from the spirit and scope of the invention as claimed.

What I claim as new is:—

1. An attachment for a lid handle comprising a clamp member formed of a single piece of sheet metal and bent in the form of pairs of lugs at the ends at one side thereof and a pair of centrally-positioned ears at its opposite side and also having bent-up posts adjacent the said ears and between the ears and one pair of end lugs, an engaging arm pivoted between the said ears, and a helical spring surrounding the said posts and contacting the said clamp and arm.

2. A clamp attachment for a lid handle comprising a sheet metal blank, the said blank being cut-away centrally at opposite sides to provide end lugs, the said lugs being right-angularly bent relative to the blank in the same direction, ears carried by the blank intermediate the end lugs and bent in an opposite direction to the lugs, the blank being further cut to provide a pair of upstanding posts lying juxtaposed and extending in the same direction as the ears, a clamping arm pivotally supported in the ears, a coil spring mounted on the posts and engaging the bottom face of the clamping arm, and connecting bolts for the lugs to retain the clamp on the lid handle.

In testimony whereof I affix my signature.

NICK DUMANSKY.

Copies of this patent may be obtained for five cents each, by addressing the "Commissioner of Patents, Washington, D. C."